US012583452B2

(12) United States Patent
     Pfau

(10) Patent No.: US 12,583,452 B2
(45) Date of Patent: Mar. 24, 2026

(54) CONTROLLER AND CONTROL METHOD OF RIDER SUPPORT SYSTEM

(71) Applicant: Robert Bosch GmbH, Stuttgart (DE)

(72) Inventor: Lars Pfau, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 146 days.

(21) Appl. No.: 18/580,900

(22) PCT Filed: Aug. 2, 2022

(86) PCT No.: PCT/IB2022/057145
     § 371 (c)(1),
     (2) Date: Jan. 19, 2024

(87) PCT Pub. No.: WO2023/012653
     PCT Pub. Date: Feb. 9, 2023

(65) Prior Publication Data
     US 2024/0326808 A1    Oct. 3, 2024

(30) Foreign Application Priority Data

Aug. 3, 2021    (JP) .................................. 2021-127027

(51) Int. Cl.
     B60W 30/16        (2020.01)
     B60K 35/10        (2024.01)
     (Continued)

(52) U.S. Cl.
     CPC ............. B60W 30/16 (2013.01); B60K 35/10 (2024.01); B60K 35/22 (2024.01); B60K 35/28 (2024.01);
     (Continued)

(58) Field of Classification Search
     CPC ................. B60W 30/16; B60W 50/14; B60W 2050/146; B60W 2300/36; B60K 35/28;
     (Continued)

(56) References Cited

U.S. PATENT DOCUMENTS

| | | | | |
|---|---|---|---|---|
| 10,882,523 B2 * | 1/2021 | Knitt | .................... | B60W 30/16 |
| 2003/0004633 A1 * | 1/2003 | Russell | ................ | H01Q 1/3233 |
| | | | | 340/436 |

(Continued)

FOREIGN PATENT DOCUMENTS

| | | | | |
|---|---|---|---|---|
| CA | 3079092 A1 * | 5/2019 | .......... | G08G 1/0962 |
| DE | 102019205881 A1 | 10/2020 | | |

(Continued)

OTHER PUBLICATIONS

International Search Report and Written Opinion for Application No. PCT/IB2022/057145 dated Nov. 8, 2022 (10 pages).

*Primary Examiner* — Tuan C To

(74) *Attorney, Agent, or Firm* — Michael Best & Friedrich LLP

(57) ABSTRACT

A controller for a rider support system has an acquisition unit and an execution unit. The acquisition unit acquires a surrounding environment information while the motorcycle travels. The surrounding environment information is information about an environment surrounding the motorcycle. The execution unit causes the motorcycle to execute an adaptive cruise control operation based on the surrounding environment information. The execution unit causes the motorcycle to execute: a first operation as the adaptive cruise control operation when a group ride mode in which the motorcycle travels together with at least one motorcycle in a group is inoperable; and a second operation as the adaptive cruise control operation when the group ride mode is operable, the second operation is different from the first operation. The execution unit causes a notification device to provide different notifications in the first operation and the second operation respectively, the notification is given to the rider.

15 Claims, 7 Drawing Sheets

(51) Int. Cl.
    *B60K 35/22*      (2024.01)
    *B60K 35/28*      (2024.01)
    *B60W 50/14*      (2020.01)

(52) U.S. Cl.
    CPC ....... *B60W 50/14* (2013.01); *B60W 2050/146*
                (2013.01); *B60W 2300/36* (2013.01)

(58) Field of Classification Search
    CPC ........ B60K 35/10; B60K 35/22; G01C 22/00;
                           G08G 1/00; B60Q 9/00
    USPC ......................................................... 701/96
    See application file for complete search history.

(56)                 References Cited

U.S. PATENT DOCUMENTS

| | | | |
|---|---|---|---|
| 2017/0225686 A1* | 8/2017 | Takaso ................ | B60W 30/165 |
| 2018/0225975 A1 | 8/2018 | Park | |
| 2019/0248367 A1 | 8/2019 | Knitt | |
| 2022/0020274 A1* | 1/2022 | Pfau ..................... | G05D 1/0289 |
| 2022/0161788 A1* | 5/2022 | Tamashima ........... | B60W 30/12 |
| 2022/0306102 A1* | 9/2022 | Kudo ................... | G06V 20/588 |

FOREIGN PATENT DOCUMENTS

| | | |
|---|---|---|
| WO | 2018197965 A1 | 11/2018 |
| WO | 2020143942 A1 | 7/2020 |

* cited by examiner

[FIG. 1]
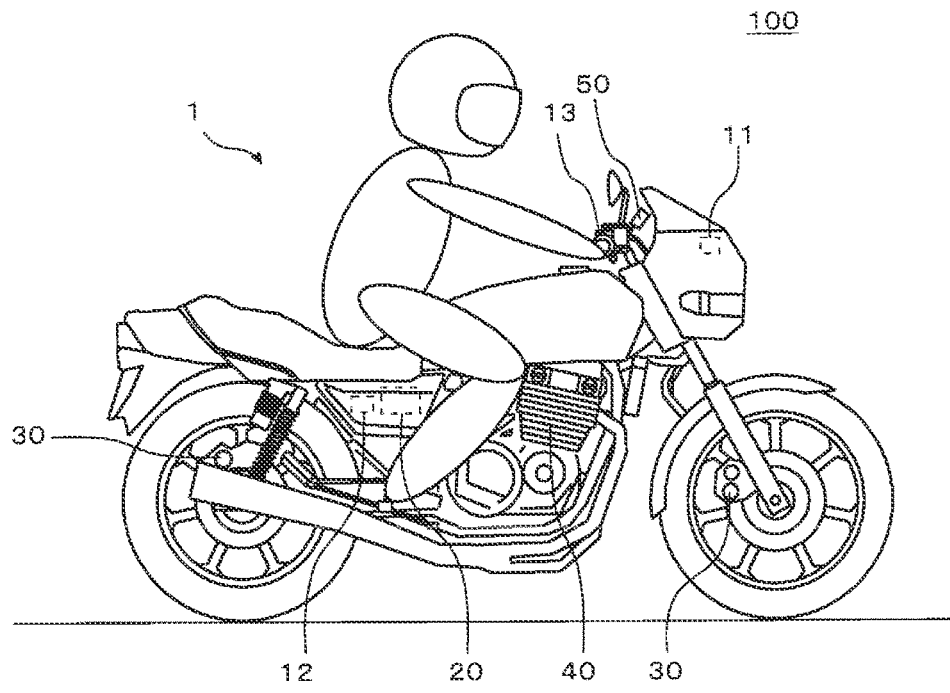
[FIG. 2]
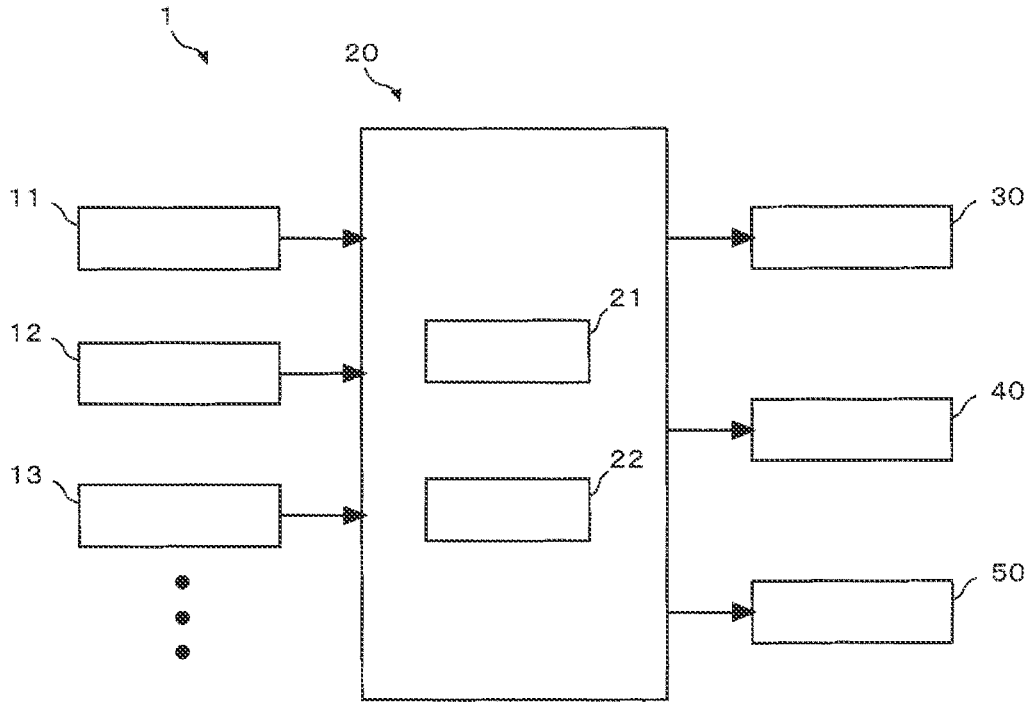

[FIG. 3]
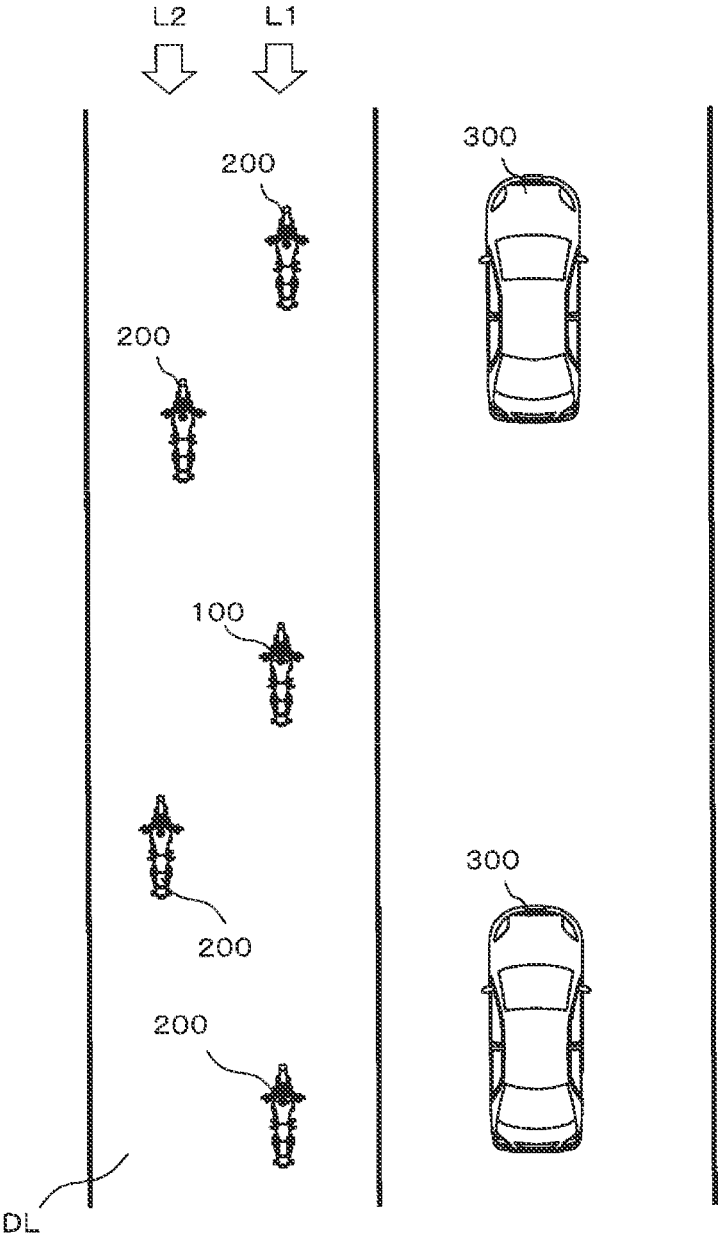

[FIG. 4]
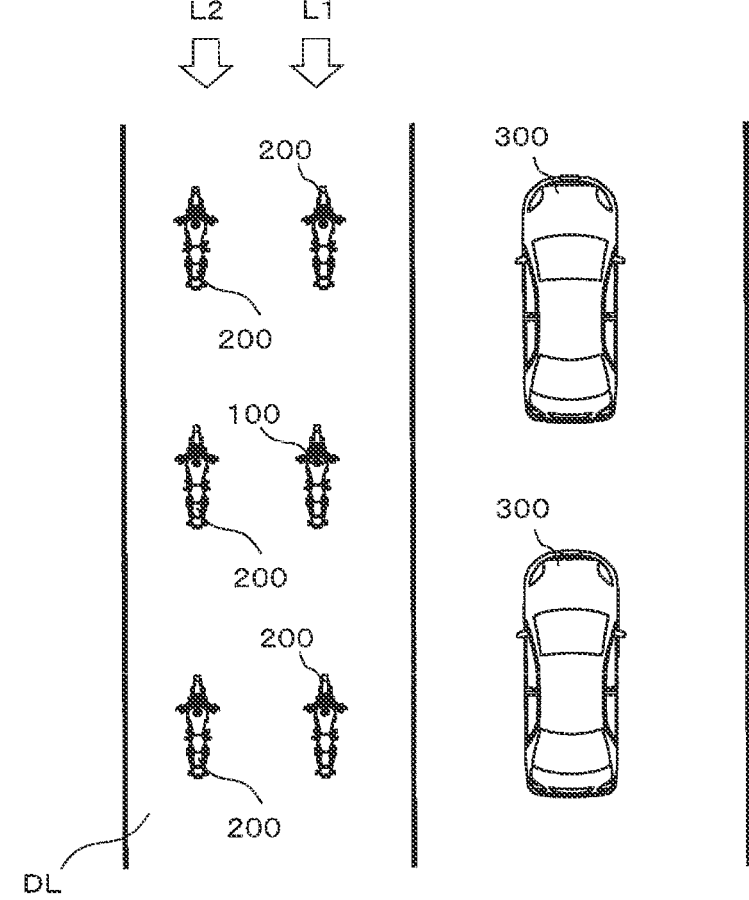
[FIG. 5]
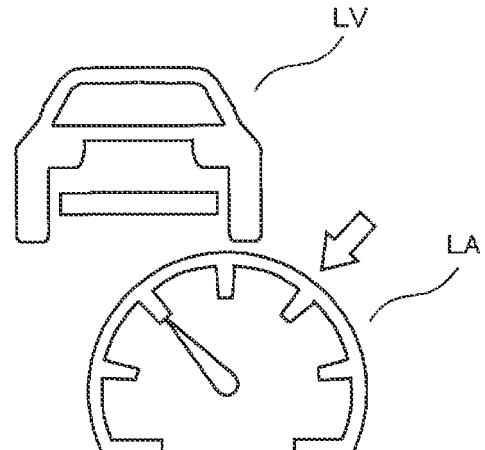

[FIG. 6]
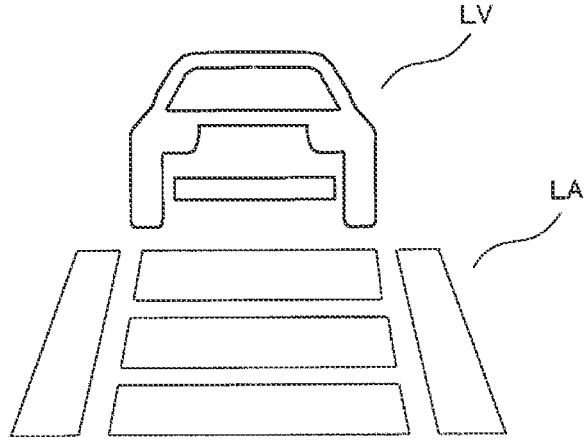
[FIG. 7]
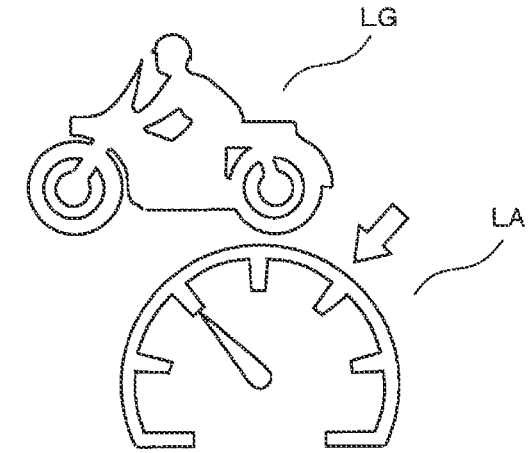
[FIG. 8]
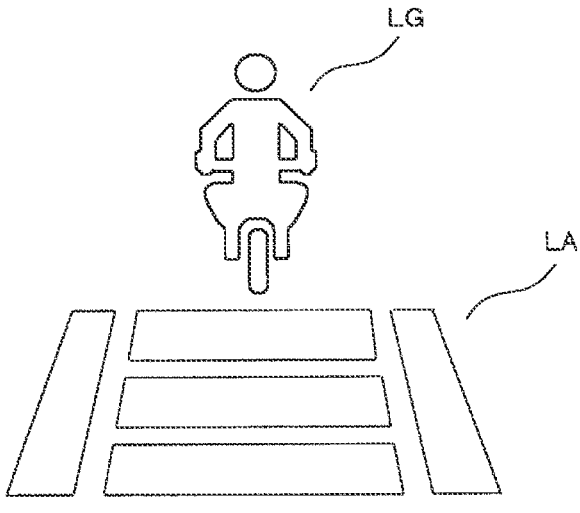

[FIG. 9]
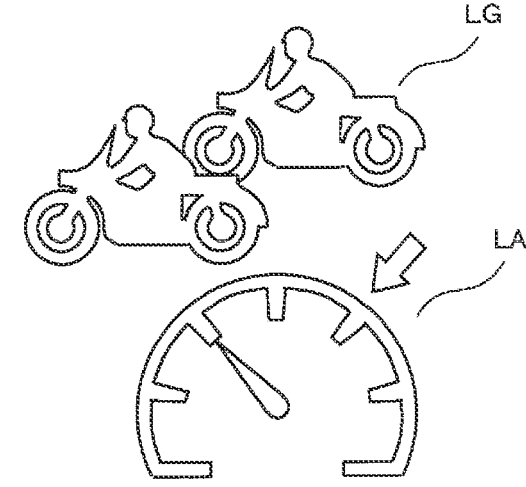
[FIG. 10]
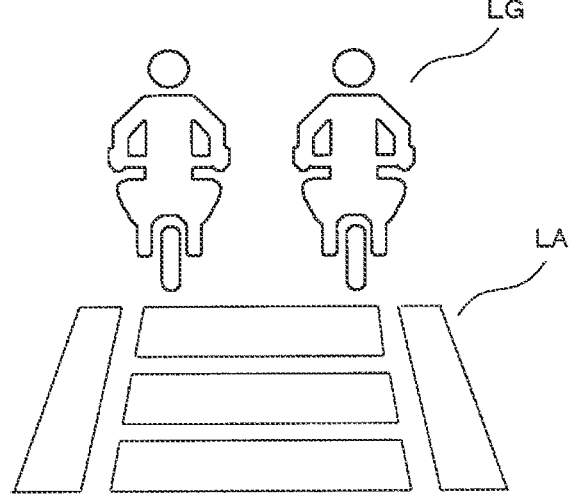
[FIG. 11]
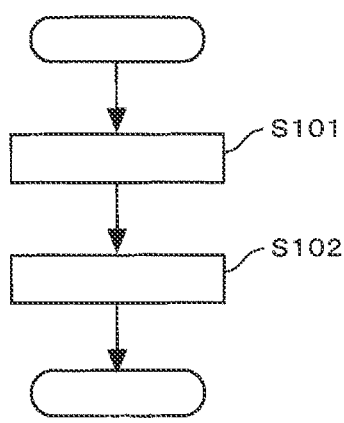

[FIG. 12]
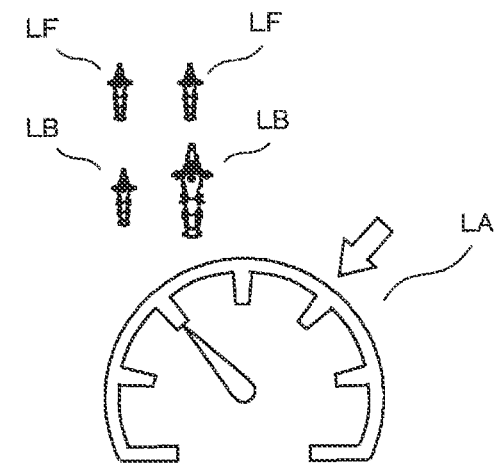
[FIG. 13]
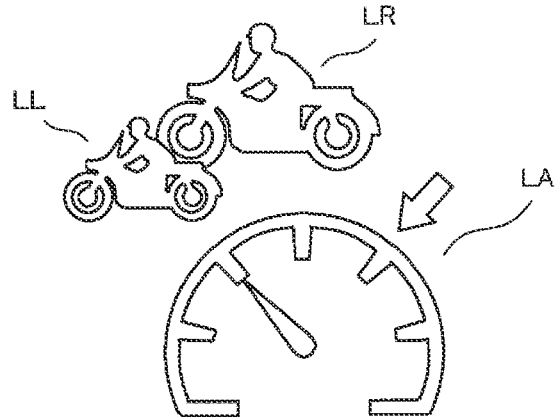
[FIG. 14]
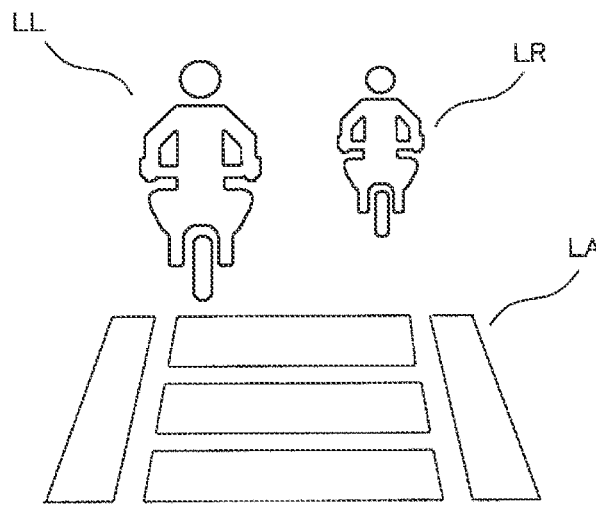

[FIG. 15]
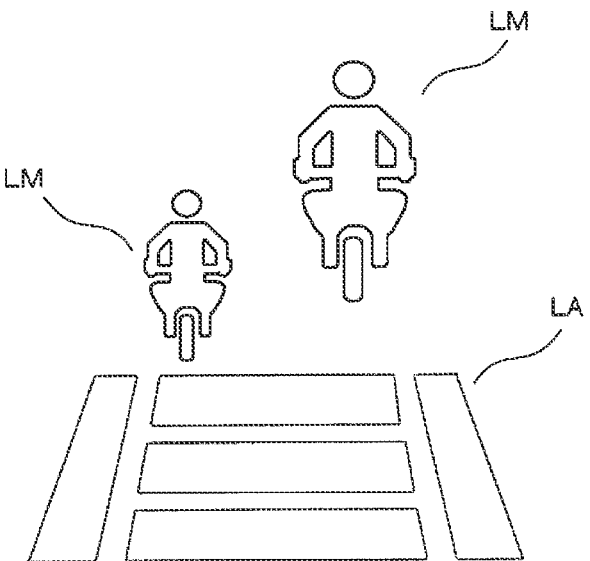

CONTROLLER AND CONTROL METHOD OF RIDER SUPPORT SYSTEM

BACKGROUND

The present invention relates to a controller for a rider support system that assists a rider in driving a motorcycle and relates to a control method for the rider support system.

Various rider support systems are known. For example, WO 2018/197965 A1 discloses a rider support system having a controller that acquires information about an environment around a motorcycle and causes the motorcycle to execute an adaptive cruise control operation based on the information.

When the motorcycle travels together with other motorcycles in a group, since a vehicle body size of the motorcycle is significantly smaller as compared to other vehicles (e.g., a passenger vehicle, a truck, and the like), a specific adaptive cruise control operation is necessary. However, when the specific adaptive cruise control operation is suddenly executed by a rider, driving supportability for the rider may deteriorate.

BACKGROUND

The present invention addresses the above-described issues. Thus, it is an objective of the present disclosure to provide a controller that suitably assist a rider in driving a motorcycle. It is another objective of the present disclosure to provide a control method for suitably assisting a rider in driving a motorcycle.

According to one aspect of the present disclosure, a controller for a rider support system has an acquisition unit and an execution unit. The acquisition unit acquires a surrounding environment information while the motorcycle travels. The surrounding environment information is information about an environment surrounding the motorcycle. The execution unit causes the motorcycle to execute an adaptive cruise control operation based on the surrounding environment information. The execution unit causes the motorcycle to execute: a first operation as the adaptive cruise control operation when a group ride mode in which the motorcycle travels together with at least one motorcycle in a group is inoperable; and a second operation as the adaptive cruise control operation when the group ride mode is operable, the second operation is different from the first operation. The execution unit causes a notification device to provide different notifications in the first operation and the second operation respectively, the notification is given to the rider.

According to one aspect of the present disclosure, a control method for a rider support system assisting a rider in driving a motorcycle includes: acquiring, using an acquisition unit of a controller, a surrounding environment information while the motorcycle travels, the surrounding environment information that is information about an environment surrounding the motorcycle; and causing, using an execution unit of a controller, the motorcycle to execute an adaptive cruise control operation based on the surrounding environment information acquired by the acquisition unit. The execution unit causes the motorcycle to execute: a first operation as the adaptive cruise control operation when a group ride mode in which the motorcycle travels together with at least one motorcycle in a group is inoperable; and a second operation as the adaptive cruise control operation when the group ride mode is operable, the second operation is different from the first operation. The execution unit causes a notification device to provide different notifications in the first operation and the second operation respectively, the notification is given to the rider.

Advantageous Effects of Invention

According to the controller and the control method of the present invention, the execution unit causes the motorcycle to execute: the first operation as the adaptive cruise control operation when the group ride mode in which the motorcycle travels together with at least one motorcycle in a group is inoperable; and the second operation as the adaptive cruise control operation when the group ride mode is operable. The execution unit causes the notification device to provide different notifications in the first operation and the second operation respectively, the notification is given to the rider. Accordingly, the rider can recognize execution of a specific adaptive cruise control operation, and thus a rider can be assisted suitably in driving a motorcycle.

BRIEF DESCRIPTION OF DRAWINGS

FIG. 1 is a view illustrating a mounting state of a rider support system according to Embodiment 1 of the invention to a motorcycle.

FIG. 2 is a view illustrating a system configuration of the rider support system according to Embodiment 1 of the invention.

FIG. 3 is a view illustrating a configuration of the rider support system according to Embodiment 1 of the invention.

FIG. 4 is a view illustrating a configuration of the rider support system according to Embodiment 1 of the invention.

FIG. 5 is a view illustrating a configuration of the rider support system according to Embodiment 1 of the invention.

FIG. 6 is a view illustrating a configuration of the rider support system according to Embodiment 1 of the invention.

FIG. 7 is a view illustrating a configuration of the rider support system according to Embodiment 1 of the invention.

FIG. 8 is a view illustrating a configuration of the rider support system according to Embodiment 1 of the invention.

FIG. 9 is a view illustrating a configuration of the rider support system according to Embodiment 1 of the invention.

FIG. 10 is a view illustrating a configuration of the rider support system according to Embodiment 1 of the invention.

FIG. 11 is a view illustrating an operation flow of a controller of the rider support system according to Embodiment 1 of the invention.

FIG. 12 is a view illustrating a configuration of a rider support system according to Embodiment 2 of the invention.

FIG. 13 is a view illustrating a configuration of a rider support system according to Embodiment 3 of the invention.

FIG. 14 is a view illustrating a configuration of the rider support system according to Embodiment 3 of the invention.

FIG. 15 is a view illustrating a configuration of a rider support system according to Embodiment 4 of the invention.

DETAILED DESCRIPTION

Hereinafter, a controller and a control method according to the invention will be described with reference to the accompanying drawings.

Note that, a configuration, an operation, and the like which are described below are illustrative only, and the controller and the control method according to the invention are not limited to cases of the configuration, the operation, and the like.

For example, in the following description, description will be given of a case where a motorcycle is an automatic two-wheeled vehicle, but the motorcycle may be an automatic three-wheeled vehicle. The motorcycle includes a motorcycle powered by an engine, a motorcycle powered by an electric motor, and the like. Examples of the motorcycles include auto bicycles, scooters, electric scooters, and the like.

In addition, in the following description, the same or similar description will be appropriately simplified or omitted. In addition, in the drawings, the same reference numeral will be given to the same or similar portion, or the reference numeral will be omitted. In addition, minute structures are appropriately simplified or omitted in the drawings.

Embodiment 1

Hereinafter, a rider support system according to Embodiment 1 will be described.
<Configuration of Rider Support System>
A configuration of the rider support system according to Embodiment 1 will be described.

FIG. 1 is a view illustrating a mounting state of a rider support system according to Embodiment 1 of the invention to the motorcycle. FIG. 2 is a view illustrating a system configuration of the rider support system according to Embodiment 1 of the invention. FIG. 3 to FIG. 10 are views illustrating a configuration of the rider support system according to Embodiment 1 of the invention.

As illustrated in FIG. 1 and FIG. 2, a rider support system 1 is mounted to a motorcycle 100. For example, the rider support system 1 includes a surrounding environment sensor 11, a vehicle behavior sensor 12, a setting input device 13, a controller (ECU) 20, a braking device 30, a drive device 40, and a notification device 50.

In the rider support system 1, the controller 20 executes a rider support operation of supporting driving of the motorcycle 100 by a rider by using an output from the surrounding environment sensor 11 and the vehicle behavior sensor 12, and an output from the setting input device 13. The controller 20 outputs a command to various devices (e.g., the braking device 30, the drive device 40, the notification device 50, and the like), and executes the rider support operation. The controller 20 receives an output from various sensors (not illustrated) configured to detect another information (e.g., information on an operation state of the braking device 30 by the rider, information on an operation state of the drive device 40 by the rider, and the like) as necessary. Respective parts of the rider support system 1 may be used exclusively for the rider support system 1, or may be shared with other systems.

The surrounding environment sensor 11 faces at least a forward side of the motorcycle 100. Examples of the surrounding environment sensor 11 includes a radar, a lidar sensor, an ultrasonic sensor, a camera, and the like.

Examples of the vehicle behavior sensor 12 include a vehicle speed sensor, an inertial sensor (IMU), and the like. The vehicle speed sensor detects a speed of the motorcycle 100. The vehicle speed sensor may detect other physical quantities capable of being substantially converted into the speed of the motorcycle 100. The inertial sensor detects acceleration of three axes, and an angular velocity of three axes (roll, pitch, and yaw) which are occurring in the motorcycle 100. The three axes are a front-rear direction of the motorcycle 100 (i.e., a longitudinal direction), a vehicle width direction of the motorcycle 100 (i.e., a lateral direction), and a vehicle height direction of the motorcycle 100.

The inertial sensor may detect other physical quantities capable of being substantially converted into the acceleration of the three axes and the angular velocity of the three axes which are occurring in the motorcycle 100. In addition, the inertial sensor may detect only a part of the acceleration of the three axes and the angular velocity of the three axes.

The setting input device 13 receives an input of various settings made by a rider. For example, the rider can switch various rider support operations by using the setting input device 13 between being operable and being inoperable. In addition, for example, the rider can set various modes or various threshold values (e.g., an upper limit value, a lower limit value, and the like) used in the various rider support operations by using the setting input device 13. The setting input device 13 may receive an operation by the body (e.g., hands, foots, and the like) of the rider, and may receive a voice emitted from the rider. In addition, the setting input device 13 may be provided to the motorcycle 100 or may be provided to equipment (e.g., a helmet, a glove, or the like) accompanying the motorcycle 100.

The controller 20 includes at least an acquisition unit 21 and an execution unit 22. All parts or each part of the controller 20 may be collectively provided in one casing or may be divided into a plurality of casings. In addition, all parts or each part of the controller 20 may be constituted, for example, by a microcomputer, a microprocessor unit, or the like, may be configured by updatable firmware or the like, or may be a program module that is executed by a command from a CPU or the like.

The acquisition unit 21 acquires a surrounding environment information while the motorcycle 100 travels. The surrounding environment information is information about an environment surrounding the motorcycle 100. The acquisition unit 21 acquires the surrounding environment information based on an output from the surrounding environment sensor 11. The surrounding environment information includes positional relationship information between the motorcycle 100 and vehicles which travel at the periphery of the motorcycle 100. Examples of the positional relationship information include information such as a relative position, a relative distance, a relative speed, relative acceleration, relative jerk, and a passing time difference. The positional relationship information may be another physical quantity information capable of being substantially converted into the above-described information. Note that, the acquisition unit 21 acquires at least the positional relationship information between the motorcycle 100 and a vehicle that precedes the motorcycle 100. When the adaptive cruise control operation to be described later reflects the positional relationship information between the motorcycle 100 and a vehicle that travels on a lateral side or a backward side of the motorcycle 100 in the automatic acceleration and deceleration operation, the acquisition unit 21 acquires the positional relationship information on the vehicle as necessary. In this case, the surrounding environment sensor 11 may face the lateral side or the backward side of the motorcycle 100 in addition to the forward side of the motorcycle 100.

The execution unit 22 causes the motorcycle 100 to execute the adaptive cruise control operation based on the surrounding environment information acquired by the acquisition unit 21 as the rider support operation. The execution unit 22 executes positional relationship adjustment control between the motorcycle 100 and a speed control target vehicle. In the positional relationship adjustment control, the execution unit 22 causes the motorcycle 100 to execute the automatic acceleration and deceleration operation so that an inter-vehicle distance or the passing time difference between the motorcycle 100 and the speed control target vehicle is close to a reference value. When the speed control target vehicle is not specified, the execution unit 22 causes the motorcycle 100 to execute the automatic acceleration and deceleration operation so that the speed of the motorcycle 100 becomes a reference value. The reference value is changed in correspondence with a setting input in the setting input device 13 by the rider.

The execution unit 22 outputs a command to the braking device 30 or the drive device 40 to cause the motorcycle 100 to execute the automatic acceleration and deceleration operation. The braking device 30 brakes the motorcycle 100. The drive device 40 drives the motorcycle 100 as a power source of the motorcycle 100. The braking device 30 may be controlled to generate or increase deceleration or may be controlled to generate or increase acceleration. The drive device 40 may be controlled to generate or increase acceleration or may be controlled to generate or increase deceleration.

In execution of the adaptive cruise control operation, the execution unit 22 causes the notification device 50 to give a notification to the rider as necessary. The notification device 50 may give a notification to the rider by display (that is, perception where a visual organ is used as a sensory organ), may give a notification to the rider by a sound (that is, perception where an auditory organ is used as a sensory organ), or may give a notification to the rider by vibration (that is, perception where a tactile organ is used as a sensory organ), or may give a notification by a combination thereof. Examples of the notification device 50 include a display, a lamp, a speaker, a vibrator, and the like. The notification device 50 may be provided to the motorcycle 100 or may be provided to equipment (e.g., a helmet, a glove, or the like) accompanying the motorcycle 100.

The execution unit 22 determines whether or not a group ride mode is operable while the motorcycle 100 travels. As illustrated in FIG. 3 and FIG. 4, the group ride mode is a mode in which the motorcycle 100 travels together with motorcycles 200 in a group, i.e., as a group.

For example, the group ride mode can be automatically switched between being operable and being inoperable by the execution unit 22 based on the surrounding environment information acquired by the acquisition unit 21. The execution unit 22 determines whether or not the group ride mode is operable based on information about the switching. The execution unit 22 determines whether the motorcycle 100 and the motorcycles 200 travel in a specific mode continuously over a reference time or a reference travel distance based on the surrounding environment information acquired by the acquisition unit 21. When the execution unit 22 determines that the motorcycle 100 and the motorcycles 200 travel in the specific mode continuously over the reference time or the reference travel distance, the execution unit 22 automatically switches the group ride mode to being operable. The specific mode is, e.g., a mode in which two vehicle lines are formed so that the motorcycle 100 and the motorcycles 200 are arranged in a zigzag pattern as illustrated in FIG. 3, a mode in which two vehicle lines are formed so that the motorcycle 100 and the motorcycles 200 are lined up side by side as illustrated in FIG. 4, or the like. The execution unit 22 may identify at least one of the motorcycles 200 located in a traveling lane DL to which the motorcycle 100 belongs and may set only the identified motorcycle(s) of the motorcycles 200 as a determination target. As another example, the execution unit 22 may identify at least one of the motorcycles 200 which are continuously located near of the motorcycle 100 over the reference time or the reference travel distance without using information about a boundary of the traveling lane DL and may set the identified motorcycle(s) of the motorcycles 200 as a determination target.

For example, the group ride mode can be switched between being operable and being inoperable by a setting input by the rider, and the execution unit 22 determines whether or not the group ride mode is operable based on an output from the setting input device 13 that is acquired by the acquisition unit 21. Note that, the execution unit 22 automatically suggests switching the group ride mode to being operable and/or suggests switching the group ride mode to being inoperable based on the surrounding environment information acquired by the acquisition unit 21, and the suggestion may be determined by a setting input of approval by the rider.

When the group ride mode is inoperable, the execution unit 22 causes the motorcycle 100 to execute a first operation as the adaptive cruise control operation. For example, in the example illustrated in FIG. 3 and FIG. 4, when it is assumed that the motorcycle 100 travels in a traveling lane on a right side of the traveling lane DL, the execution unit 22 performs positional relationship adjustment control of the motorcycle 100 with respect to one vehicle 300 that travels on a forward side of the motorcycle 100. That is, in the first operation, the speed control target vehicle is the one vehicle 300 that actually exists.

When the group ride mode is operable, the execution unit 22 causes the motorcycle 100 to execute a second operation different from the first operation as the adaptive cruise control operation.

As an example, in the example illustrated in FIG. 3 and FIG. 4, the execution unit 22 executes a positional relationship adjustment control for the motorcycle 100 with respect to a selected motorcycle 200 selected from the motorcycles 200 which precede the motorcycle 100. That is, in the second operation, the speed control target vehicle is the selected motorcycle 200 that actually exists. Preferably, only the motorcycles 200 traveling together with the motorcycle 100 in a group can be subject to be selected as the selected motorcycle 200. It may be determined whether the motorcycles 200 are vehicles which are traveling together with the motorcycle 100 in a group based on information registered in advance by a rider or based on time passage information on the positional relationship with respect to the motorcycle 100. The information registered in advance by the rider is, e.g., a position information about a traveling position of the motorcycle 100 in the group, an identification information about characteristics of the motorcycles 200 belonging to the group, and the like.

Specifically, when the group ride mode is operable, the acquisition unit 21 acquires, as the surrounding environment information, a positional relationship information between the motorcycle 100 and each of the motorcycles 200 traveling together with the motorcycle 100 in a group. The execution unit 22 selects, as the selected motorcycle 200, a motorcycle that is located closest to the motorcycle 100 among the motorcycles 200. The execution unit 22 determines a target value of an output from the braking device 30 or a target value of an output from the drive device 40 so that the positional relationship between the motorcycle 100 and the selected motorcycle 200 becomes optimized. The selected motorcycle 200 may be one of the motorcycles 200 that is located at the shortest straight-line distance to the motorcycle 100. As another example, selected motorcycle 200 may be one of the motorcycles 200 that is located at the shortest distance to the motorcycle 100 along the front-rear direction of the motorcycle 100. In addition, the execution unit 22 may select, as the selected motorcycle 200, one of the motorcycles 200 that is located closest to the motorcycle 100 among the motorcycles 200 in a first vehicle line L1 to which the motorcycle 100 belongs. As another example, the execution unit 22 may select, as the selected motorcycle 200, one of the motorcycles 200 that is not located closest to the motorcycle 100 among the motorcycles 200 in at the first vehicle line L1 to which the motorcycle 100 belongs (e.g., that is located second closest to the motorcycle 100 in the first vehicle line L1). As illustrated in FIG. 3, the motorcycle 100 and the motorcycles 200 may form two vehicle lines so that the motorcycle 100 and the motorcycles 200 are arranged in a zigzag pattern. In this situation, when the first vehicle line L1 to which the motorcycle 100 belongs and a second vehicle line L2 to which the motorcycle 100 does not belong approach each other (e.g., when the group is turning a curve, or the like), the execution unit 22 may select, as the selected motorcycle 200, one of the motorcycles 200 that is located closest to the motorcycle 100 among the motorcycles 200 belonging to the second vehicle line L2 to which the motorcycle 100 does not belong. As another example, the execution unit 22 may select, as the selected motorcycle 200, one of the motorcycles 200 that is not located closest to the motorcycle 100 among the motorcycles 200 belonging to the second vehicle line L2 to which the motorcycle 100 does not belong. For example, the selected motorcycle 200 may be one of the motorcycles 200 that is located second closest to the motorcycle 100 among the motorcycles 200 belonging to the second vehicle line L2.

As another example, in the example illustrated in FIG. 3 and FIG. 4, the execution unit 22 executes positional relationship adjustment control of the motorcycle 100 with respect to a virtual moving object that represents the motorcycles 200 at least temporarily. That is, in the second operation, the speed control target vehicle is the virtual moving object, i.e., the motorcycles 200. Preferably, the virtual moving object represents the motorcycles 200 travel together with the motorcycle 100 in a group, only. For example, it is determined whether the motorcycles 200 are vehicles traveling together with the motorcycle 100 in a group based on information registered in advance by a rider or based on time passage information on the positional relationship with respect to the motorcycle 100. The information registered in advance by a rider may be, e.g., a position information about a traveling position of the motorcycle 100 in the group, an identification information about characteristics of the motorcycles 200 belonging to the group, and the like.

Specifically, when the group ride mode is operable, the acquisition unit 21 acquires, as the surrounding environment information, the positional relationship information between the other motorcycle 100 and each of the motorcycles 200 traveling together with the motorcycle 100 in a group. In addition, the execution unit 22 determines a target value used in a positional relationship adjustment control based on a set of positional relationship information acquired for each of the motorcycles 200 by the acquisition unit 21. For simplification of processing in the execution unit 22, the acquisition unit 21 may acquire the positional relationship information between the motorcycle 100 and the motorcycles 200 in a front-rear direction of the motorcycle 100, and the positional relationship information between the motorcycle 100 and the motorcycles 200 in the left-right direction of the motorcycle 100.

The execution unit 22 derives a virtual positional relationship information between the motorcycle 100 and the virtual moving object based on the set of positional relationship information acquired for each of the motorcycles 200 by the acquisition unit 21. Subsequently, the execution unit 22 determines the target value used in the positional relationship adjustment control based on the virtual positional relationship information. The execution unit 22 determines a weight of each of the motorcycles 200 with which the positional relationship information is acquired by the acquisition unit 21. The execution unit 22 substitutes the weight for the following Mathematical Formula 1 to derive the virtual positional relationship information. The execution unit 22 determines a target value of an output from the braking device 30 or a target value of an output from the drive device 40 so that the positional relationship between the motorcycle 100 and the virtual moving object which is expressed as the virtual positional relationship information is optimized.

$$PV = P1 \times k1 + P2 \times k2 \qquad \text{[Mathematical Formula 1]}$$

In Mathematical Formula 1: PV represents the virtual positional relationship information; P1 represents the positional relationship information relating to a first selected motorcycle 200 that is located closest to the motorcycle 100 in the first vehicle line L1 and precedes the motorcycle 100; k1 represents the weight of the first selected motorcycle 200; P2 represents the positional relationship information relating to a second selected motorcycle 200 that is located closest to the motorcycle 100 in the second vehicle line L2 and precedes the motorcycle 100, and k2 represents the weight of the second selected motorcycle 200. The sum of the weight k1 and the weight k2 is 1. Each of the weights k1 and k2 is determined as a numeral value that is greater than 0 and smaller than 1. Each of the weights k1 and k2 may be 0 or 1 as necessary. When the weight k1 or the weight k2 is 0 or 1, one of the first selected motorcycle 200 and the second selected motorcycle 200 that actually exists may be set as a speed control target vehicle. The execution unit 22 may use, as the positional relationship information P1, the positional relationship information between the motorcycle 100 and the first selected motorcycle 200 in the front-rear direction. The execution unit 22 may use the positional relationship information between the motorcycle 100 and the first selected motorcycle 200 in the left-right direction when determining the weight k1. The execution unit 22 may use, as the positional relationship information P2, the positional relationship information between the motorcycle 100 and the second selected motorcycle 200 in the front-rear direction. The execution unit 22 may use the positional relationship information between the motorcycle 100 and the second selected motorcycle 200 in the left-right direction when determining the weight k2. Each of the weights k1 and k2 may be a fixed value. Each of the weights k1 and k2 may appropriately set by the rider.

Alternatively, the execution unit 22 determines a separate target value that is a target value used in a separate positional adjustment control performed with respect to each of the motorcycles 200 based on a set of positional relationship information acquired for each of the motorcycles 200 by the acquisition unit 21. The execution unit 22 determines the separate target value used in the separate positional relationship adjustment control based on the separate target value determined for each of the motorcycles 200. The execution unit 22 determines an separate target value for an output from the braking device 30 or an separate target value for an output from the drive device 40 so that respective ones of the positional relationships between the motorcycle 100 and the motorcycles 200 is optimized. The execution unit 22 determines a weight of each of the motorcycles 200, for which the positional relationship information is acquired by the acquisition unit 21, and determines a target value of an actual output from the braking device 30 or a target value of an actual output from the drive device 40 by substituting the weight for the following Mathematical Formula 2.

$$TV = T1 \times k1 + T2 \times k2 \qquad \text{[Mathematical Formula 2]}$$

In Mathematical Formula 2: TV represents a target value of an actual positional relationship adjustment control; T1 represents a separate target value with respect to the first selected motorcycle 200 that is located closest to the motorcycle 100 in the first vehicle line L1 and precedes the motorcycle 100; k1 represents the weight of the first selected motorcycle 200; T2 represents a separate target value with respect to the second selected motorcycle 200 that is located closest to the motorcycle 100 in the second vehicle line L2 and precedes the motorcycle 100; and k2 represents the weight of the second selected motorcycle 200. The sum of the weight k1 and the weight k2 is 1. Each of the weights k1 and k2 is determined as a numeral value that is greater than 0 and smaller than 1. Each of the weights k1 and k2 may be 0 or 1 as necessary. When the weight k1 or the weight k2 is 0 or 1, one of the first selected motorcycle 200 and the second selected motorcycle 200 that actually exists may be set as a speed control target vehicle. The execution unit 22 may use the positional relationship information between the motorcycle 100 and the first selected motorcycle 200 in the front-rear direction of the motorcycle 100 when determining the separate target value T1. The execution unit 22 may use the positional relationship information between the motorcycle 100 and the first selected motorcycle 200 in the left-right direction of the motorcycle 100 when determining the weight k1. The execution unit 22 may use the positional relationship information between the motorcycle 100 and the second selected motorcycle 200 in the front-rear direction of the motorcycle 100 when determining the separate target value T2. The execution unit 22 may use the positional relationship information between the motorcycle 100 and the second selected motorcycle 200 in the left-right direction of the motorcycle 100 when determining the weight k2. Each of the weights k1 and k2 may be a fixed value. Each of the weights k1 and k2 may appropriately set by the rider.

The execution unit 22 sets the weight k2 of the second selected motorcycle 200 that is located closest to the motorcycle 100 in the second vehicle line L2 and precedes the motorcycle 100 to be smaller than the weight k1 of the first selected motorcycle 200 that is located closest to the motorcycle 100 in the first vehicle line L1 and precedes the motorcycle 100. In addition, the execution unit 22 increases the weight k2 of the second selected motorcycle 200 when the positional relationship information between the motorcycle 100 and the second selected motorcycle 200 shows that a degree of approaching each other along the left-right direction is high or is increasing rapidly.

The virtual moving object may represents the first selected motorcycle 200, the second selected motorcycle 200, a third selected motorcycle 200 that is located second closest to the motorcycle 100 in the first vehicle line L1 and precedes the motorcycle 100, and/or a fourth selected motorcycle 200 that is located second closest to the motorcycle

100 in the second vehicle line L2 and precedes the motorcycle 100. The execution unit 22 sets a weight of the fourth selected motorcycle 200 that is located second closest to the motorcycle 100 in the second vehicle line L2 and precedes the motorcycle 100 to be smaller than a weight of the third selected motorcycle 200 that is located second closest to the motorcycle 100 in the first vehicle line L1 and precedes the motorcycle 100. The execution unit 22 sets the weight of the third selected motorcycle 200 that is located second closest to the motorcycle 100 in the first vehicle line L1 and precedes the motorcycle 100 to be smaller than the weight k1 of the first selected motorcycle 200 that is located closest to the motorcycle 100 in the first vehicle line L1 and precedes the motorcycle 100. The execution unit 22 sets the weight of the fourth selected motorcycle 200 that is located second closest to the motorcycle 100 in the second vehicle line L2 and precedes the motorcycle 100 to be smaller than the weight k2 of the second selected motorcycle 200 that is located closest to the motorcycle 100 in the second vehicle line L2 and precedes the motorcycle 100.

Here, the execution unit 22 makes a notification for a rider which is executed in the notification device 50 different between the first operation and the second operation. Note that, hereinafter, description will be given of a case where the notification device 50 gives a notification for the rider by display (that is, perception where a visual organ is used as a sensory organ), but similar notification is realized even in the other cases.

In the first operation, the execution unit 22 executes an operation of causing the notification device 50 to display a mark LV in addition to a mark LA. The mark LA represents the type of the rider support operation. The mark LV means that the group ride mode is inoperable. The mark LA may be a mark representing the adaptive cruise control operation as illustrated in FIG. 5 or may be a mark representing a speed control mode (e.g., a passing time difference mode, an inter-vehicle mode, or the like) that is set in the adaptive cruise control operation as illustrated in FIG. 6. The mark LV may be displayed to be adjacent to the mark LA. The mark LV is an illustration representing one vehicle (e.g., a passenger vehicle, or the like) other than a motorcycle. The illustration may show a state when the vehicle is viewed from a backward side. For another example, the illustration may show a state when the vehicle is viewed form a forward side, a lateral side, or an upward side. The mark LV may be a character or a symbol that means the group ride mode is inoperable or that represents a vehicle other than the motorcycle. The execution unit 22 displays the mark LV when the speed control target vehicle in the adaptive cruise control operation is specified, does not display the mark LV when the speed control target vehicle in the adaptive cruise control operation is not specified, or displays the mark LV with various appearances (e.g., different colors, different concentrations, types of line, or the like).

For example, as illustrated in FIG. 7 to FIG. 10, in the second operation, the execution unit 22 executes an operation of causing the notification device 50 to display a mark LG instead of the mark LV. The mark LG means that the group ride mode is operable. The mark LG may be displayed adjacently to the mark LA. The mark LG may represent one motorcycle as illustrated in FIG. 7 and FIG. 8, or may represent a plurality of motorcycles as illustrated in FIG. 9 and FIG. 10. The mark LG is an illustration representing a motorcycle. The illustration may represent a state when the motorcycle is viewed from a lateral side, may represent a state when the motorcycle is viewed from a backward side, or may represent a state when the motorcycle is viewed from a forward side or an upward side. In addition, the mark LG may be an illustration including a rider, or an illustration that does not include the rider. The mark LG may be a character or a symbol that means the group ride mode is operable, that represents the group ride mode itself, or that represents a motorcycle. In the adaptive cruise control operation in a state in which the group ride mode is operable, the execution unit 22 causes the notification device 50 to display the mark LG regardless of the type of an actual speed control target vehicle. In addition, in the adaptive cruise control operation in a state in which the group ride mode is operable, the execution unit 22 causes the notification device 50 to display the mark LG regardless of actual existence or absence of another motorcycle 200 that precedes the motorcycle 100 and travels together with the motorcycle 100 in a group. The execution unit 22 displays the mark LG when the speed control target vehicle in the adaptive cruise control operation is specified, does not display the mark LG when the speed control target vehicle in the adaptive cruise control operation is not specified, or displays the mark LG by changing a mode (e.g., a color, a concentration, a line type, or the like). Note that, the execution unit 22 may cause the notification device 50 to execute an operation of displaying the mark LG in addition to the mark LV.

<Operation of Rider Support System>

Description will be given of an operation of the rider support system according to Embodiment 1.

FIG. 11 is a view illustrating an operation flow of the controller of the rider support system according to Embodiment 1 of the invention.

The controller 20 executes an operation flow illustrated in FIG. 11 while the motorcycle 100 travels.

(Acquisition Step)

In step S101, the acquisition unit 21 acquires the surrounding environment information while the motorcycle 100 travels. In addition, the acquisition unit 21 acquires various pieces of information as necessary.

(Execution Step)

In Step S102, the execution unit 22 causes the motorcycle 100 to execute the adaptive cruise control operation based on the surrounding environment information acquired by the acquisition unit 21. The execution unit 22 causes the motorcycle 100 to execute the first operation as the adaptive cruise control operation when the group ride mode is inoperable, and causes the motorcycle 100 to execute the second operation different from the first operation as the adaptive cruise control operation when the group ride mode is operable. The execution unit 22 makes a notification for a rider which is executed in the notification device 50 different between the first operation and the second operation.

<Effect of Rider Support System>

Description will be given of an effect of the rider support system according to Embodiment 1.

In the controller 20, the execution unit 22 makes a notification for the rider which is executed in the notification device 50 different between the first operation that is the adaptive cruise control operation executed when the group ride mode is inoperable, and the second operation that is the adaptive cruise control operation executed when the group ride mode is operable. Accordingly, the rider can recognize execution of a specific adaptive cruise control operation, and thus driving supportability for the rider is improved.

Preferably, in the second operation, the execution unit 22 causes the notification device 50 to display the mark LG that means the group ride mode is operable. According to this configuration, a rider reliably recognizes execution of a specific adaptive cruise control operation, and thus driving supportability for the rider is improved. Particularly, the mark LG may represent one motorcycle. In this case, a visual recognition property of the rider can be improved while conforming to a demand for a reduction in size of the notification device 50 in the motorcycle 100. In addition, particularly, the mark LG may represent two motorcycles. In this case, the rider can intuitively recognize that the group ride mode is operable.

Preferably, in the second operation, the execution unit 22 changes how to display (e.g., appearances of) the mark LG shown by the notification device 5. The mark LG means that the group ride mode is operable. Specifically, the execution unit 22 changes how to display the mark LG depending on a variation of a control parameter of the automatic acceleration and deceleration operation that is executed by the motorcycle 100. For example, in the adaptive cruise control operation, a target value of the braking device 30 or the drive device 40 which is output from the execution unit 22 varies in correspondence with whether or not the speed control target vehicle is specified. Accordingly, display of the mark LG synchronizes with the variation of the control parameter of the automatic acceleration and deceleration operation. According to this configuration, the rider reliably recognizes execution of the specific adaptive cruise control operation, and thus driving supportability for the rider is improved.

Embodiment 2

Hereinafter, description will be given of a rider support system according to Embodiment 2. Note that, the rider support system according to Embodiment 2 is different from the rider support system according to Embodiment 1 in the notification for the rider which the execution unit 22 causes the notification device 50 to execute in the second operation. Description of redundant or similar contents will be omitted.

<Configuration of Rider Support System>

A configuration of the rider support system according to Embodiment 2 will be described.

FIG. 12 is a view illustrating a configuration of the rider support system according to Embodiment 2 of the invention.

As illustrated in FIG. 12, in the second operation, the execution unit 22 causes the notification device 50 to display at least one leading vehicle mark LF that is a mark representing one leading vehicle in a group and at least one following vehicle mark LB that is a mark representing one following vehicle in the group in addition to the mark LA representing the type of the rider support operation. The leading vehicle may be a leading vehicle in a vehicle line of the group or may be a leading vehicle in the entirety of the group. The execution unit 22 may set the number of the leading vehicle mark LF and the following vehicle mark LB to a fixed value regardless of an actual number of motorcycles 200 constituting the group or may be changed in conformity to the actual number of the motorcycles 200 constituting the group. The mark LA may be a mark representing the adaptive cruise control operation. The leading vehicle mark LF and the following vehicle mark LB may be displayed adjacently to the mark LA. Each of the leading vehicle mark LF and the following vehicle mark LB may represent one motorcycle. Each of the leading vehicle mark LF and the following vehicle mark LB is an illustration representing a motorcycle. The illustration may show a state in which the motorcycle is viewed from an upward side. For another example, the illustration may show a state in which the motorcycle is viewed from a forward side, a backward side, or a lateral side. In addition, each of the leading vehicle mark LF and the following vehicle mark LB may be an illustration that includes a rider, or an illustration that does not include the rider. The leading vehicle mark LF may be a character or a symbol that represents the leading vehicle, and the following vehicle mark LB may be a character or a symbol that represents the following vehicle. In the adaptive cruise control operation in a state in which the group ride mode is set to be operable, the execution unit 22 causes the notification device 50 to display the leading vehicle mark LF and the following vehicle mark LB regardless of the type of an actual speed control target vehicle. The execution unit 22 may display the leading vehicle mark LF and the following vehicle mark LB in a fixed positional relationship regardless of a positional relationship of respective vehicles on an actual road or may display the marks in a positional relationship corresponding to the positional relationship of the respective vehicles on the actual road. The execution unit 22 may display the leading vehicle mark LF and the following vehicle mark LB in parallel to each other in an upper and lower direction. In addition, in a situation in which a group is traveling in a mode in which two vehicle lines are formed so that the motorcycle 100 and the motorcycles 200 are arranged in a zigzag pattern as illustrated in FIG. 3, or in a situation in which the group is traveling in a mode in which two vehicle lines are formed so that the motorcycle 100 and the motorcycles 200 are lined up side by side as illustrated in FIG. 4, two leading vehicle marks LF and two following vehicle marks LB may be displayed to be shifted in an upper and lower direction, respectively, or may be displayed side by side, respectively. The execution unit 22 may display the following vehicle mark LB by dividing the following vehicle mark LB into a mark representing an intermediate vehicle between the leading vehicle and the last vehicle in a group, and a mark representing the last vehicle in the group. The execution unit 22 displays the leading vehicle mark LF and the following vehicle mark LB when the speed control target vehicle in the adaptive cruise control operation is specified, and does not display the leading vehicle mark LF and the following vehicle mark LB when the speed control target vehicle in the adaptive cruise control operation is not specified, or may display the marks by changing a mode (e.g., a color, a concentration, a line type, or the like). Note that, the execution unit 22 may cause the notification device 50 to execute an operation of displaying the leading vehicle mark LF and the following vehicle mark LB in addition to the mark LV.

The execution unit 22 causes the notification device 50 to display the leading vehicle mark LF in an emphasized manner as compared to the following vehicle mark LB when the motorcycle 100 is leading vehicle in the group, and causes the notification device 50 to displays the following vehicle mark LB in an emphasized manner as compared to the leading vehicle mark LF when the motorcycle 100 is a following vehicle in the group. In a case of displaying two leading vehicle marks LF and two following vehicle marks LB, respectively, the execution unit 22 displays the leading vehicle mark LF or the following vehicle mark LB on a side corresponding to the first vehicle line L1 to which the motorcycle 100 belongs in an emphasized manner. The execution unit 22 may emphasize the leading vehicle mark LF or the following vehicle mark LB by enlarging the display, may emphasize the leading vehicle mark LF or the following vehicle mark LB by brightening a display color, may emphasize the leading vehicle mark LF or the following vehicle mark LB by darkening the display, or may emphasize the leading vehicle mark LF or the following vehicle mark LB by attaching a character or a symbol. In a state in which it is difficult to determine that the motorcycle 100 is a leading vehicle or a following vehicle, the execution unit 22 may cause the notification device 50 to display the leading vehicle mark LF or the following vehicle mark LB without emphasis, or may not cause the notification device 50 to display the leading vehicle mark LF or the following vehicle mark LB. In addition, when the motorcycle 100 is a leading vehicle, the execution unit 22 may not cause the notification device 50 to display the following vehicle mark LB.

<Effect of Rider Support System>

Description will be given of an effect of the rider support system according to Embodiment 2.

In the controller 20, the execution unit 22 makes a notification for a rider, which is executed in the notification device 50, different between the first operation that is an adaptive cruise control operation executed when the group ride mode is inoperable, and the second operation that is an adaptive cruise control operation executed when the group ride mode is operable. Accordingly, the rider can recognize execution of a specific adaptive cruise control operation, and thus driving supportability for the rider is improved.

Preferably, in the second operation, the execution unit 22 causes the notification device 50 to display at least one leading vehicle mark LF that is a mark representing one leading vehicle in a group and at least one following vehicle mark LB that is a mark representing one following vehicle in the group, respectively. According to this configuration, the rider can intuitively recognize that the group ride mode is operable. Particularly, the execution unit 22 may cause the notification device 50 to display the leading vehicle mark LF in an emphasized manner as compared to the following vehicle mark LB when the motorcycle 100 is a leading vehicle in the group, and cause the notification device 50 to display the following vehicle mark LB in an emphasized manner as compared to the leading vehicle mark LF when the motorcycle 100 is a following vehicle in the group. According to this configuration, the rider reliably recognizes execution of a specific adaptive cruise control operation, and thus driving supportability for the rider is improved.

Preferably, in the second operation, the execution unit 22 makes display of at least one of the leading vehicle mark LF and the following vehicle mark LB by the notification device 50 different in correspondence with a variation of a control parameter of the automatic acceleration and deceleration operation that is executed by the motorcycle 100. For example, in the adaptive cruise control operation, the target value of the braking device 30 or the drive device 40 which is output from the execution unit 22 varies between a case where the motorcycle 100 is a leading vehicle and a case where the motorcycle 100 is a following vehicle. Accordingly, emphasis of the leading vehicle mark LF or the following vehicle mark LB synchronizes with a variation of the control parameter of the acceleration and deceleration operation. According to this configuration, the rider reliably recognizes execution of a specific adaptive cruise control operation, and thus driving supportability for the rider is improved.

Embodiment 3

Hereinafter, description will be given of a rider support system according to Embodiment 3. Note that, the rider support system according to Embodiment 3 is different from the rider support system according to Embodiment 1 in the notification for the rider which the execution unit 22 causes the notification device 50 to execute in the second operation. Description of redundant or similar contents will be omitted.

<Configuration of Rider Support System>

A configuration of the rider support system according to Embodiment 3 will be described.

FIG. 13 and FIG. 14 are views illustrating a configuration of the rider support system according to Embodiment 3 of the invention.

As illustrated in FIG. 13, in the second operation, the execution unit 22 causes the notification device 50 to display a right vehicle line mark LR that is a mark representing a right vehicle line in a group and a left vehicle line mark LL that is a mark representing a left vehicle line in the group in addition to the mark LA representing the type of the rider support operation. The mark LA may be a mark representing the adaptive cruise control operation. The right vehicle line mark LR and the left vehicle line mark LL may be displayed adjacently to the mark LA. Each of the right vehicle line mark LR and the left vehicle line mark LL may represent one motorcycle. The right vehicle line mark LR and the left vehicle line mark LL are illustrations representing a motorcycle. The illustrations may show a state in which the motorcycle is viewed from a lateral side. For another example, the illustrations may show a state in which the motorcycle is viewed from a forward side, a backward side, or an upward side. In addition, the right vehicle line mark LR and the left vehicle line mark LL may be illustrations which include a rider or may be illustrations which do not include the rider. The right vehicle line mark LR may be a character or a symbol that represents a right vehicle line in the group, and the left vehicle line mark LL may be a character or a symbol that represents a left vehicle line in the group. In the adaptive cruise control operation in a state in which the group ride mode is operable, the execution unit 22 causes the notification device 50 to display the right vehicle line mark LR and the left vehicle line mark LL regardless of the type of an actual speed control target vehicle. The execution unit 22 may display the right vehicle line mark LR and the left vehicle line mark LL in a fixed positional relationship regardless of a positional relationship of vehicle lines on an actual road, or in a positional relationship (e.g., a position, an interval, or the like) corresponding to the positional relationship of vehicle lines on the actual road. The execution unit 22 displays the right vehicle line mark LR and the left vehicle line mark LL when the speed control target vehicle in the adaptive cruise control operation is specified, and does not display the right vehicle line mark LR and the left vehicle line mark LL when the speed control target vehicle in the adaptive cruise control operation is not specified, or may display the marks by changing a mode (e.g., a color, a concentration, a line type, or the like). Note that, the execution unit 22 may cause the notification device 50 to execute an operation of displaying the right vehicle line mark LR and the left vehicle line mark LL in addition to the mark LV.

The execution unit 22 causes the notification device 50 to display the right vehicle line mark LR in an emphasized manner as compared to the left vehicle line mark LL when the motorcycle 100 belongs to the right vehicle line in the group, and causes the notification device 50 to display the left vehicle line mark LL in an emphasized manner as compared to the right vehicle line mark LR when the motorcycle 100 belongs to the left vehicle line in the group. The execution unit 22 may emphasize the right vehicle line mark LR or the left vehicle line mark LL by enlarging the display, may emphasize the right vehicle line mark LR or the left vehicle line mark LL by brightening a display color, may emphasize the right vehicle line mark LR or the left vehicle line mark LL by darkening the display, or may emphasize the right vehicle line mark LR or the left vehicle line mark LL by attaching a character or a symbol. In a state in which it is difficult to determine that the motorcycle 100 belongs to the right vehicle line or the left vehicle line, the execution unit 22 may cause the notification device 50 to display the right vehicle line mark LR and the left vehicle line mark LL without emphasis, or may not cause the notification device 50 to display the right vehicle line mark LR and the left vehicle line mark LL.

As illustrated in FIG. 14, the execution unit 22 may cause the notification device 50 to display a mark representing a speed control mode (e.g., a passing time difference mode, an inter-vehicle distance mode, or the like) that is set in the adaptive cruise control operation as the mark LA representing the type of the rider support operation instead of the mark representing the adaptive cruise control operation. The execution unit 22 causes the notification device 50 to display a mark representing a vehicle line, to which a selected motorcycle 200 that precedes the motorcycle 100 on the closest side belongs, between the right vehicle line mark LR and the left vehicle line mark LL in an emphasized manner as compared to the other mark. The selected motorcycle 200 may be one of the motorcycles 200 that is located at the shortest straight-line distance to the motorcycle 100 or may be one of the motorcycles 200 that is located at the shortest distance to the motorcycle 100 along the front-rear direction of the motorcycle 100. The execution unit 22 may emphasize the right vehicle line mark LR or the left vehicle line mark LL by enlarging the display, may emphasize the right vehicle line mark LR or the left vehicle line mark LL by brightening a display color, may emphasize the right vehicle line mark LR or the left vehicle line mark LL by darkening the display, or may emphasize the right vehicle line mark LR or the left vehicle line mark LL by attaching a character or a symbol. The execution unit 22 may locate the lowest portion of a mark on a non-emphasis side in the right vehicle line mark LR or the left vehicle line mark LL on an upper side as compared to the lowest portion of an emphasis mark. Particularly, the execution unit 22 may locate the lowest portion of a non-emphasis mark on a further upper side as a straight-line distance or a distance along the front-rear direction between the first selected motorcycle 200 and the second selected motorcycle 200 increases. The first selected motorcycle 200 is one of the motorcycles 200 that belongs in the right vehicle line, precedes the motorcycle 100, and is located closest to the motorcycle 100. The second selected motorcycle 200 is one of the motorcycles 200 that belongs in the left vehicle line, precedes the motorcycle 100, and is located closest to the motorcycle 100. When it is difficult to determine whether the motorcycle 100 belongs to the right vehicle line or the left vehicle line, the execution unit 22 may cause the notification device 50 to display the right vehicle line mark LR and the left vehicle line mark LL without emphasis or may not cause the notification device 50 to display the right vehicle line mark LR and the left vehicle line mark LL.

<Effect of Rider Support System>

Description will be given of an effect of the rider support system according to Embodiment 3.

In the controller 20, the execution unit 22 makes a notification for a rider which is executed in the notification device 50 different between the first operation that is an adaptive cruise control operation executed when the group ride mode is inoperable and the second operation that is an adaptive cruise control operation executed when the group ride mode is operable. Accordingly, the rider can recognize execution of the specific adaptive cruise control operation, and thus driving supportability for the rider is improved.

Preferably, in the second operation, the execution unit 22 causes the notification device 50 to display the right vehicle line mark LR that is a mark representing a right vehicle line in a group, and the left vehicle line mark LL that is a mark representing a left vehicle line in the group. According to this configuration, the rider can intuitively recognize that the group ride mode is operable. Particularly, the execution unit 22 may cause the notification device 50 to display the right vehicle line mark LR in an emphasized manner as compared to the left vehicle line mark LL when the motorcycle 100 belongs to the right vehicle line in the group, and may cause the notification device 50 to display the left vehicle line mark LL in an emphasized manner as compared to the right vehicle line mark LR when the motorcycle 100 belongs to the left vehicle line in the group. In addition, particularly, the execution unit 22 may display a mark representing a vehicle line, to which a selected motorcycle 200 preceding the motorcycle 100 and being located closest to the motorcycle 100 belongs, between the right vehicle line mark LR and the left vehicle line mark LL in an emphasized manner as compared to the other marks. According to this configuration, the rider reliably recognizes execution of the specific adaptive cruise control operation, and thus driving supportability for the rider is improved.

Preferably, in the second operation, the execution unit 22 makes display of at least one of the right vehicle line mark LR and the left vehicle line mark LL by the notification device 50 different in correspondence with a variation of a control parameter of the automatic acceleration and deceleration operation that is executed by the motorcycle 100. For example, in the adaptive cruise control operation, a target value of the braking device 30 or the drive device 40 which is output from the execution unit 22 varies between a case where the motorcycle 100 belongs to the right vehicle line and a case where the motorcycle 100 belongs to the left vehicle line. Accordingly, emphasis of the right vehicle line mark LR or the left vehicle line mark LL synchronizes with the variation of the control parameter of the automatic acceleration and deceleration operation. According to this configuration, the rider reliably recognizes execution of the specific adaptive cruise control operation, and thus driving supportability for the rider is improved.

Embodiment 4

Hereinafter, description will be given of a rider support system according to Embodiment 4. Note that, the rider support system according to Embodiment 4 is different from the rider support system according to Embodiment 1 in the notification for the rider which the execution unit 22 causes the notification device 50 to execute in the second operation. Description of redundant or similar contents will be omitted.
<Configuration of Rider Support System>

A configuration of the rider support system according to Embodiment 4 will be described.

FIG. 15 is a view illustrating a configuration of the rider support system according to Embodiment 4 of the invention.

As illustrated in FIG. 15, in the second operation, the execution unit 22 causes the notification device 50 to display a plurality of marks LM each representing a selected motorcycle 200 that precedes the motorcycle 100 in addition to the mark LA representing the type of the rider support operation. The marks LM represent the motorcycles 200 different from each other. The mark LA may be a mark representing a speed control mode (e.g., a passing time difference mode, an inter-vehicle distance mode, or the like) that is set in the adaptive cruise control operation. The marks LM may be displayed adjacently to the mark LA. The marks LM are illustrations representing a motorcycle. The illustrations may represent a state when the motorcycle is viewed from a backward side, may represent a state when the motorcycle is viewed from a forward side, a lateral side, or an upward side. In addition, the marks LM may be illustrations which include a rider or illustration which do not include the rider. The marks LM may be characters or symbols which represent the selected motorcycle 200. The execution unit 22 may display the marks LM in a fixed positional relationship regardless of a positional relationship of respective vehicles on an actual road, or in a positional relationship (e.g., a position, an interval, or the like) corresponding to the positional relationship of the respective vehicles on the actual road. The execution unit 22 displays the marks LM when the speed control target vehicle in the adaptive cruise control operation is specified and does not display the marks LM when the speed control target vehicle in the adaptive cruise control operation is not specified.

The execution unit 22 selects, as the speed control target vehicle in the second operation, a selected motorcycle 200 from the motorcycles 200 for which the positional relationship information is acquired by the acquisition unit 21. In this case, the execution unit 22 causes the notification device 50 to display the mark LM representing the selected motorcycle 200 selected as the speed control target vehicle in an emphasized manner as compared to the marks representing the other motorcycles 200 which are not selected as the speed control target vehicle. Alternatively, the execution unit 22 determines a weight (i.e., k1 and k2 in Mathematical Formula 1 and Mathematical Formula 2) of each of the motorcycles 200 for which the positional relationship information is acquired by the acquisition unit 21 and executes the second operation based on the weight. In this case, the execution unit 22 causes the notification device 50 to display the mark LM representing the selected motorcycle 200 in which the weight is large in an emphasized manner as compared to the marks LM representing other motorcycles in which the weight is small. The execution unit 22 may emphasize the mark LM by enlarging the display, may emphasize the mark LM by brightening a display color, may emphasize the mark LM by darkening the display, or may emphasize the mark LM by attaching a character or a symbol (particularly, a value of the weight that is determined to be large). The execution unit 22 may locate the lowest portion of a mark representing a first selected motorcycle 200 to be located above the lowest portion of a mark representing a second selected motorcycle 200. In this case, the first selected motorcycle 200 is one of the motorcycles located away from the motorcycle 100 in front of the motorcycle 100, and the second selected motorcycle 200 is one of the motorcycles located near the motorcycle 100 in front of the motorcycle 100. Particularly, the lowest portion of the mark representing the first selected motorcycle 200 located away from the motorcycle 100 may be moved upward as the straight-linear distance or the distance along the front-rear direction between the motorcycle 100 and the first selected motorcycle 200 increases.

When the positional relationship information is acquired by the acquisition unit 21 with respect to each of the motorcycles 200, execution unit 22 may select some of the motorcycles 200 and may display only marks LM corresponding to the selected motorcycles 200. As another example, the execution unit 22 may not select some of the motorcycles 200 and may display marks LM corresponding to all motorcycles 200. When selecting a selected motorcycles 200, the selected motorcycle 200 may be preferably located at the straight-linear distance or the distance along the front-rear direction between the motorcycle 100 and the selected motorcycle 200 is small or may be preferably assigned with a large weight.

<Effect of Rider Support System>

Description will be given of an effect of the rider support system according to Embodiment 4.

In the controller 20, the execution unit 22 makes the notification for the rider which is executed in the notification device 50 different between the first operation that is the adaptive cruise control operation executed when the group ride mode is inoperable, and the second operation that is the adaptive cruise control operation executed when the group ride mode is operable. Accordingly, the rider can recognize execution of a specific adaptive cruise control operation, and thus driving supportability for the rider is improved.

Preferably, in the second operation, the execution unit 22 causes the notification device 50 to display the plurality of marks LM each representing one another motorcycle 200 that precedes the motorcycle 100. According to this configuration, the rider can intuitively recognize that the group ride mode is operable. Particularly, the execution unit 22 may display the mark LM representing a selected motorcycle 200 selected as the speed control target vehicle in an emphasized manner as compared to the marks LM representing motorcycles 200 which are not selected as the speed control target vehicle. In addition, particularly, the execution unit 22 may display the mark LM representing the selected motorcycle 200 in which the weight is large in an emphasized manner as compared to the marks LM representing the motorcycles 200 in which the weight is small. According to this configuration, the rider reliably recognizes execution of the specific adaptive cruise control operation, and thus driving supportability for the rider is improved.

Preferably, in the second operation, the execution unit 22 makes display of at least a part of a plurality of marks LM by the notification device 50 different depending on a variation of a control parameter of the automatic acceleration and deceleration operation that is executed by the motorcycle 100. For example, in the adaptive cruise control operation, a target value of the braking device 30 or the drive device 40 which is output from the execution unit 22 varies in correspondence with a positional relationship of the motorcycles 200 with respect to the motorcycle 100. Accordingly, emphasis of the mark LM synchronizes with the variation of the control parameter of the automatic acceleration and deceleration operation. According to this configuration, the rider reliably recognizes execution of the specific adaptive cruise control operation, and thus driving supportability of the rider is improved.

Hereinbefore, description has been given of Embodiment 1 to Embodiment 4, but only a part of the embodiments may be carried out, parts of the embodiments may be combined with each other, or parts of the embodiments may be changed to other aspects. That is, the invention is not limited to description of Embodiment 1 to Embodiment 4.

For example, in the above description, description has been given of a case where the positional relationship information between the motorcycle 100 and a selected motorcycle 200 is acquired based on an output of the surrounding environment sensor 11, but the acquisition unit 21 may acquire the positional relationship information between the motorcycle 100 and the selected motorcycle 200 by using another means (e.g., radio communication between the motorcycle 100 and the other motorcycle 200, radio communication between the motorcycle 100 and a peripheral infrastructure facility, and the like).

In addition, for example, in the above description, description has been given of a case where the group ride mode is a mode in which the motorcycle 100 travels together with the motorcycles 200 in a group, but the group ride mode may be a mode in which the motorcycle 100 traves together with one another motorcycle 200 in a group. Even in this case, the same effect is obtained by the same configuration.

REFERENCE SIGNS LIST

1: Rider support system
11: Surrounding environment sensor
12: Vehicle behavior sensor
13: Setting input device
20: Controller
21: Acquisition unit
22: Execution unit
30: Braking device
40: Drive device
50: Notification device
100: Motorcycle
200: Motorcycle
300: Vehicle
DL: Traveling lane
L1: First vehicle line
L2: Second vehicle line
LA: Mark representing type of rider support operation
LV: Mark showing that group ride mode is inoperable
LG: Mark showing that group ride mode is operable
LF: Leading vehicle mark
LB: Following vehicle mark
LR: Right vehicle line mark
LL: Left vehicle line mark
LM: Mark representing another motorcycle

The invention claimed is:

1. A controller (20) for a rider support system (1), the rider support system (1) configured to assist a rider in driving a motorcycle (100), the controller (20) configured to:

acquire a surrounding environment information via a surrounding environment sensor (11) while the motorcycle (100) travels, wherein the surrounding environment information is information about an environment surrounding the motorcycle; and cause the motorcycle (100) to execute an adaptive cruise control operation based on the surrounding environment information acquired by the the controller (20), wherein the controller (20) is configured to cause the motorcycle (100) to execute:

a first operation as the adaptive cruise control operation when a group ride mode in which the motorcycle (100) travels together with at least one motorcycle (200) in a group is inoperable; and a second operation as the adaptive cruise control operation when the group ride mode is operable, the second operation is different from the first operation, and the controller (20) is configured to cause a notification device (50) to provide different notifications in the first operation and the second operation respectively, wherein the notification is given to the rider.

2. The controller (20) according to claim 1, wherein the controller (20), in the second operation, configured to cause the notification device (50) to display a mark (LG) showing that the group ride mode is operable.

3. The controller (20) according to claim 2, wherein the mark (LG) represents one motorcycle.

4. The controller (20) according to claim 2, wherein the mark (LG) represents a plurality of motorcycles.

5. The controller (20) according to claim 1, wherein the controller (20), in the second operation, is configured to cause the notification device (50) to display:
at least one leading vehicle mark (LF) that is a mark representing a leading vehicle in the group; and
at least one following vehicle mark (LB) that is a mark representing a following vehicle in the group.

6. The controller (20) according to claim 5, wherein the controller (20), in the second operation, is configured to:
cause the notification device (50) to display the leading vehicle mark (LF) in an emphasized manner as compared to the following vehicle mark (LB) when the motorcycle (100) is the leading vehicle in the group; and
cause the notification device (50) to display the following vehicle mark (LB) in an emphasized manner as compared to the leading vehicle mark (LF) when the motorcycle (100) is the following vehicle in the group.

7. The controller (20) according to claim 1, wherein the controller (20), in the second operation, is configured to cause the notification device (50) to display:
a right vehicle line mark (LR) that is a mark representing a right vehicle line in the group; and
a left vehicle line mark (LL) that is a mark representing a left vehicle line in the group.

8. The controller (20) according to claim 7, wherein the controller (20), in the second operation, is configured to cause the notification device (50) to display:
the right vehicle line mark (LR) in an emphasized manner as compared to the left vehicle line mark (LL) when the motorcycle (100) belongs to the right vehicle line in the group; and
the left vehicle line mark (LL) in an emphasized manner as compared to the right vehicle line mark (LR) when the motorcycle (100) belongs to the left vehicle line in the group.

9. The controller (20) according to claim 7, wherein the controller (20), in the second operation, is configured to cause the notification device (50) to display one mark of the right vehicle line mark (LR) and the left vehicle line mark (LL) in an emphasized manner as compared to the other mark of the right vehicle line mark (LR) and the left vehicle line mark (LL), and the one mark represents the other motorcycle (200) that is located closest to the motorcycle (100) in front of the motorcycle (100).

10. The controller (20) according to claim 1, wherein the controller (20), in the second operation, is configured to cause the notification device (50) to display a plurality of marks (LM) representing a plurality of motorcycles (200) respectively, and the plurality of motorcycles (200) are motorcycles that precede the motorcycle (100).

11. The controller (20) according to claim 10, wherein the controller (20) is configured to acquire, as the surrounding environment information, a positional relationship information that is information about a positional relationship between the motorcycle (100) and each of the plurality of motorcycles (200), the controller (20) is configured to select, as a speed control target vehicle in the second operation, the at least one motorcycle (200) from the plurality of motorcycles (200) each of which is a subject to acquire the positional relationship information by the controller (20), and
the controller (20), in the second operation, is configured to cause the notification device (50) to display the mark (LM) representing the at least one motorcycle (200) selected as the speed control target vehicle in an emphasized manner as compared to the mark (LM) representing a rest of the plurality of motorcycles (200) which are not selected as the speed control target vehicle.

12. The controller (20) according to claim 10, wherein the controller (20) is configured to acquire, as the surrounding environment information, a positional relationship information that is information about a positional relationship between the motorcycle (100) and each of the plurality of motorcycles (200), the controller (20) is configured to:
determine a weight of each of the plurality of motorcycles (200), the each of the plurality of motorcycles (200) a subject to acquire the positional relationship information by the the controller (20); and
execute the second operation based on the weight,
the the controller (20), in the second operation, is configured to cause the notification device (50) to display the mark (LM) representing a first motorcycle (200) of the plurality of motorcycles (200) in an emphasized manner as compared to the mark (LM) representing a second motorcycle (200) of the plurality of motorcycles (200), and
the first motorcycle (200) has the weight that is greater than the weight of the second motorcycle (200).

13. The controller (20) according to claim 2, wherein the controller (20), in the second operation, is configured to cause the notification device (50) to change how to display the marks (LG, LF, LB, LR, LL, and LM) depending on parameters of the automatic acceleration and deceleration operation that is executed by the motorcycle (100).

14. The controller (20) according to claim 2, wherein the marks (LG, LF, LB, LR, LL, and LM) are illustrations representing a motorcycle.

15. A control method for a rider support system (1), the rider support system (1) configured to assist a rider in driving a motorcycle (100), the control method comprising:
acquiring, using a controller (20), a surrounding environment information while the motorcycle (100) travels, the surrounding environment information that is information about an environment surrounding the motorcycle; and
causing, using the controller (20), the motorcycle (100) to execute an adaptive cruise control operation based on the surrounding environment information acquired by the the controller (20), wherein
the controller (20) is configured to cause the motorcycle (100) to execute
a first operation as the adaptive cruise control operation when a group ride mode in which the motorcycle (100) travels together with at least one motorcycle (200) in a group is inoperable; and
a second operation as the adaptive cruise control operation when the group ride mode is operable, the second operation is different from the first operation, and
the controller (20) is configured to cause a notification device (50) to provide different notifications in the first operation and the second operation respectively, wherein the notification is given to the rider.

\* \* \* \* \*